(12) United States Patent
Kadono et al.

(10) Patent No.: US 10,381,662 B2
(45) Date of Patent: Aug. 13, 2019

(54) SEPARATOR FOR FUEL CELL, FUEL CELL, AND MANUFACTURING METHOD OF SEPARATOR

(71) Applicants: TOYOTA JIDOSHA KABUSHIKI KAISHA, Toyota-shi, Aichi-ken (JP); Sumitomo Riko Company Limited, Komaki-shi, Aichi (JP)

(72) Inventors: Hideya Kadono, Toyota (JP); Kenji Sato, Toyota (JP); Takuya Kurihara, Toyota (JP); Fumishige Shizuku, Toyota (JP); Hiroki Itakura, Kitanagoya (JP); Takahiro Aoki, Kasugai (JP)

(73) Assignees: Toyota Jidosha Kabushiki Kaisha, Aichi-ken (JP); Sumitomo Riko Company Limited, Tokyo (JP)

( * ) Notice: Subject to any disclaimer, the term of this patent is extended or adjusted under 35 U.S.C. 154(b) by 427 days.

(21) Appl. No.: 14/934,185

(22) Filed: Nov. 6, 2015

(65) Prior Publication Data
US 2016/0141636 A1 May 19, 2016

(30) Foreign Application Priority Data

Nov. 13, 2014 (JP) .................... 2014-230339

(51) Int. Cl.
*H01M 8/0297* (2016.01)
*H01M 8/0228* (2016.01)
(Continued)

(52) U.S. Cl.
CPC ....... *H01M 8/0297* (2013.01); *H01M 8/0228* (2013.01); *H01M 8/0273* (2013.01);
(Continued)

(58) Field of Classification Search
CPC ............ H01M 8/0297; H01M 8/0228; H01M 8/0273; H01M 8/0276; H01M 2008/1095
See application file for complete search history.

(56) References Cited

U.S. PATENT DOCUMENTS 9,562,609 B2* 2/2017 Shimazoe ........... H01M 8/0284
2003/0141672 A1 7/2003 Andou et al.
(Continued)

FOREIGN PATENT DOCUMENTS

CA   2 288 862 A1    5/2000
EP      1691434  *  8/2006
(Continued)

*Primary Examiner* — Ula C Ruddock
*Assistant Examiner* — Thomas H. Parsons
(74) *Attorney, Agent, or Firm* — Finnegan, Henderson, Farabow, Garrett & Dunner, LLP

(57) ABSTRACT

A separator for a fuel cell, to be disposed opposing to a membrane electrode assembly, is provided. The separator includes a separator central area portion opposing to a center area of the membrane electrode assembly that concerns generating power, an outer edge portion located in an outer edge of the separator central area portion, a rubber molded body made of rubber, the rubber molded body being formed in the outer edge portion by die-casting a die-casting rubber material using die, and an adhesive layer formed in the outer edge portion, for adhering the rubber molded body to the outer edge portion. The adhesive layer is formed over an adhesive layer area that includes and is larger than an area where the rubber molded body is die-casted in the outer edge portion. Thus, a disadvantage due to burrs which are generated when die-casting the rubber molded body can be reduced.

3 Claims, 5 Drawing Sheets

(51) Int. Cl.
    *H01M 8/0273* (2016.01)
    *H01M 8/0276* (2016.01)
    *H01M 8/1018* (2016.01)
(52) U.S. Cl.
    CPC .. *H01M 8/0276* (2013.01); *H01M 2008/1095* (2013.01); *Y02P 70/56* (2015.11)

(56) References Cited

U.S. PATENT DOCUMENTS

2008/0166617 A1* 7/2008 Shizuku .............. H01M 8/0273
                                                 429/444
2012/0077110 A1* 3/2012 Kim .................... H01M 8/0206
                                                 429/508

FOREIGN PATENT DOCUMENTS

| JP | 2003-220664 A | 8/2003 |
| JP | 2004-055276   | 2/2004 |
| JP | 2004-225721 A | 8/2004 |
| JP | 2008-146986   | 6/2008 |
| JP | 2009-099531 A | 5/2009 |
| JP | 2010-190237 A | 9/2010 |
| JP | 2013181551  * | 9/2013 |

* cited by examiner

SEPARATOR FOR FUEL CELL, FUEL CELL, AND MANUFACTURING METHOD OF SEPARATOR

CROSS-REFERENCE TO RELATED APPLICATION

The present application claims priority from Japanese application P2014-230339 filed on Nov. 13, 2014, the content of which is hereby incorporated by reference into this application.

BACKGROUND

Field

The present invention relates to a separator for a fuel cell, the fuel cell, and a method of manufacturing the separator.

Related Art

A fuel cell has a stacked structure in which a plurality of unit cells, each of which serves as a power generator, are stacked. Each unit cell includes separators, and the separators divide the unit cell from other adjacent cells. Each separator involves in supply and discharge of fuel gas, oxygen containing gas, and cooling water to/from the unit cell, and is provided with a gasket for sealing passages of the gas and cooling water. The gasket is formed by die-casting rubber-like elastic material. Since the die-casting often involves leaks of the die-casting rubber material from cavities for shaping the gasket, which causes a formation of burrs, the burrs must be addressed somehow. As one approach of addressing the burrs, for example, JP2008-146986A proposes an approach in which an air vent portion is formed in a die at a merging portion of die-casting rubber material, an excessive part of the die-casting rubber material is forced to fill in the air vent portion to collect the burrs in the air vent portion, and the burrs are cut and removed.

Although the approach described above can reduce the formation of burrs at parts other than the air vent portion, the cutting of the burrs at the air vent portion may cause damages to the gasket. Therefore, a burr cutting mechanism with a higher positioning precision is required, and a careful burr cutting work is necessary, resulting in a complicated process as a whole. For this reason, a simple burr handling in the die-casting product made of rubber-like elastic material, such as a gasket, came to be demanded.

SUMMARY

In order to solve at least a part of the subject described above, the present invention can be implemented in terms of the following aspects.

(1) According to one aspect of the invention, a separator for a fuel cell is provided. The separator for the fuel cell, to be disposed opposing to a membrane electrode assembly, may include a separator central area portion opposing to a center area of the membrane electrode assembly that concerns generating power, an outer edge portion located in an outer edge of the separator central area portion, a rubber molded body made of rubber, the rubber molded body being formed in the outer edge portion by die-casting a die-casting rubber material using die, and an adhesive layer formed in the outer edge portion, for adhering the rubber molded body to the outer edge portion. The adhesive layer is formed over an adhesive layer area that includes and is larger than an area where the rubber molded body is die-casted in the outer edge portion.

As adopting the aspect described above, in the separator for the fuel cell, when forming the adhesive layer and the rubber molded body in the outer edge portion which extends toward the outer edge from the separator central area portion which opposes to the power generating area of the membrane electrode assembly, the adhesive layer can be formed prior to the formation of the rubber molded body, and the rubber molded body can be adhered by the adhesive layer. Since the rubber molded body is formed by die-casting the die-casting rubber material using the die, burrs may be formed during the die-casting in a membrane shape connected with the rubber molded body due to leaked die-casting rubber material when the die-casting rubber material leaks from between the die and the adhesive layer. Since the burr has the membrane shape, it does not affect the functions of the rubber molded body, for example, a sealing function in the outer edge portion and a rectifying function of fluid. However, if the burr is released from the rubber molded body, it may cause adverse effects to the functions of the rubber molded body. Thus, in the separator for the fuel cell of the aspect described above, the adhesive layer is formed in the adhesive layer area that includes and is larger than the area where the rubber molded body is die-casted in the outer edge portion, the membrane-shaped burr formed so as to be connected with the rubber molded body adheres to the outer edge portion by the adhesive layer. Therefore, if the separator for the fuel cell adopts the aspect described above, since the release and exfoliation of the burr from the rubber molded body can be reduced, the burr handling becomes simple, for example, at least a part of cutting of the burr becomes unnecessary, a possible damage to the rubber molded body accompanying the burr cutting can be avoided, etc.

(2) In the separator for the fuel cell of the aspect described above, the separator may further include a central area portion side rubber molded body made of rubber. The central area portion side rubber molded body may be formed by die-casting the die-casting rubber material using the die, in the outer edge portion on the separator central area portion side from a position of the rubber molded body. The central area portion side rubber molded body may be die-casted from the die-casting rubber material that leaks from between the die and the adhesive layer when die-casting the rubber molded body, at a height lower than a height of the rubber molded body from a surface of the outer edge portion, and may be adhered to the outer edge portion by the adhesive layer. The central area portion side rubber molded body may be connected with the rubber molded body on a surface of the adhesive layer by a burr formed from the leaked die-casting rubber material. If the separator is configured as described above, there are the following advantages. The separator for the fuel cell of this aspect is provided with the central area portion side rubber molded body; however, it is separated toward the separator central area portion side from the rubber molded body, and, in addition, the height of the central area portion side rubber molded body from the surface of the outer edge portion is lower than that of the rubber molded body. Therefore, the influence to the functions of the rubber molded body, such as the sealing function and the rectifying function of fluid, can be reduced. Further, the central area portion rubber molded body is formed by the die-casting rubber material which leaked from between the die and the adhesive layer when die-casting the rubber molded body being collected in the die. Therefore, the leaked die-casting rubber material becomes difficult to move toward the separator central area portion side, compared with a formed part of the central area portion side rubber molded body. For this reason, a generation of a burr on the separator central area portion side can be reduced, and a situation where the power generating area of the membrane electrode assembly which opposes to the separator central area portion becomes narrow due to the burr can be reduced. This contributes to a reservation of the power generating area of the membrane electrode assembly, and, as the result, a retention of power generating performance of the fuel cell. Other than described above, since the burr which connects the central area portion side rubber molded body with the rubber molded body is adhered to the outer edge portion by the adhesive layer, it becomes difficult to cause the release and exfoliation of the burr.

(3) According to another aspect of the invention, a method of manufacturing a separator is provided. The method of manufacturing the separator to be disposed opposing to a membrane electrode assembly includes forming an adhesive layer by applying thermosetting adhesive to an outer edge portion located in an outer edge of a separator central area portion opposing to a center area of the membrane electrode assembly that concerns generating power, placing the separator, where the adhesive layer is formed, in die having cavities for die-casting a rubber molded body made of rubber, injecting die-casting rubber material into the cavities to die-cast the rubber molded body, and curing by heat the adhesive of the adhesive layer to obtain an adhesive effect and hardening the injected die-casting rubber material. The forming the adhesive layer includes applying the adhesive over an adhesive layer area that includes and is larger than an area where the rubber molded body is die-casted in the outer edge portion. As adopting this aspect, the separator with no damage or less damage to the rubber molded body can easily be manufactured.

(4) According to still another aspect of the invention, a fuel cell is provided. The fuel cell includes a cell stack formed by stacking a plurality of unit cells. Each of the unit cells is configured as a power generation unit. The unit cell includes the separator for the fuel cell of the aspect described above so as to oppose to the membrane electrode assembly that is formed by joining catalyst electrode layers on both membrane surfaces of an electrolyte membrane. Thus, since the fuel cell has the separator with less damage to the rubber molded body, an improvement in durability and an extension of life of the fuel cell are possible. Further, according to the fuel cell of the aspect described above, since a separator is replaced in an existing fuel cell, a reduction in manufacturing cost is possible.

Note that the present invention can be implemented in various forms, for example, the method of manufacturing the separator for the fuel cell, a method of manufacturing the fuel cell, and die for die-casting the separator for the fuel cell.

BRIEF DESCRIPTION OF THE DRAWINGS

The present disclosure is illustrated by way of example and not by way of limitation in the figures of the accompanying drawings, in which the like reference numerals indicate like elements and in which.

DESCRIPTION OF THE EMBODIMENTS

Figure 1:
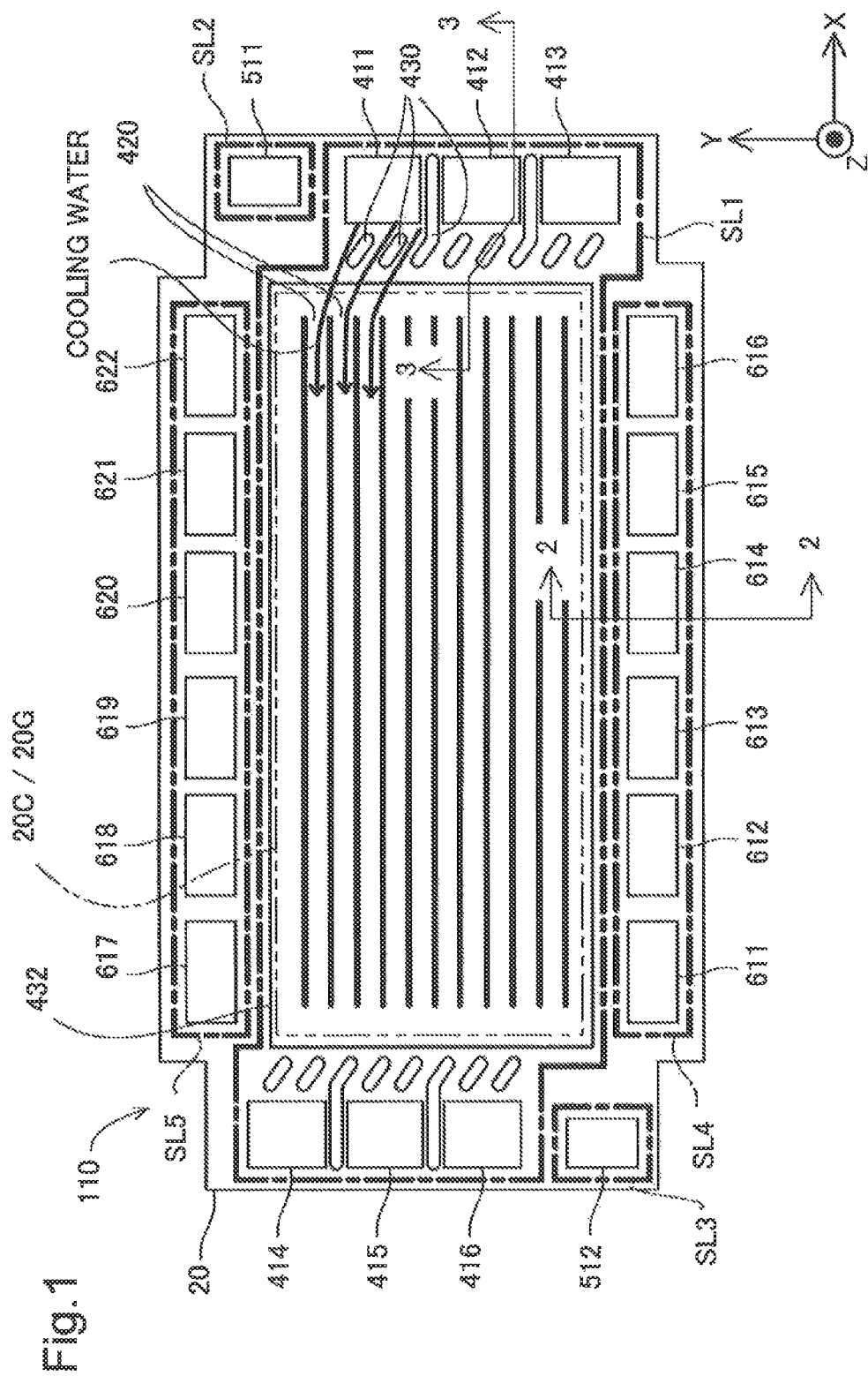
FIG. 1 is a plan view illustrating a unit cell as one embodiment of the invention.
Figure 2:
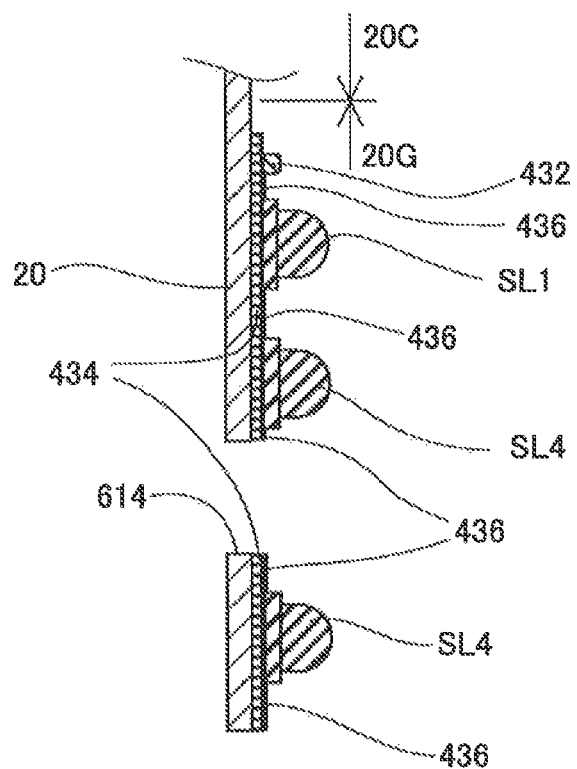
FIG. 2 is a cross-sectional view illustrating a first separator taken along a line 2-2 in FIG. 1.
Figure 3:
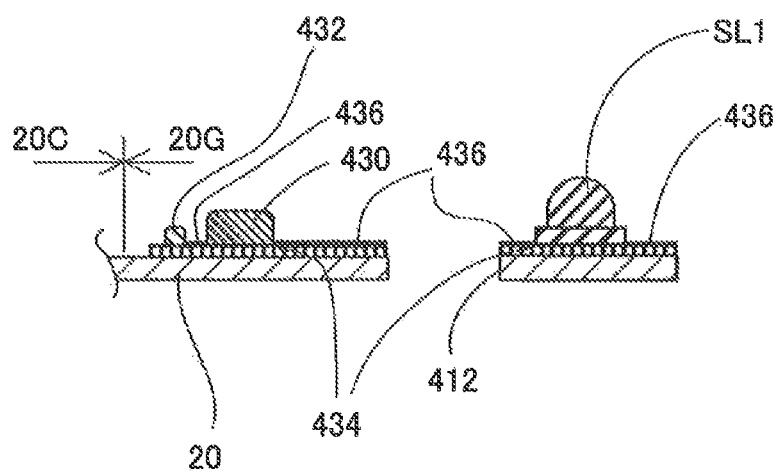
FIG. 3 is a cross-sectional view illustrating the first separator taken along a line 3-3 in FIG. 1.

Hereinafter, one embodiment of the present invention is described with reference to the accompanying drawings. FIG. 1 is a plan view illustrating a unit cell 110 as one embodiment of the invention, FIG. 2 is a cross-sectional view illustrating a first separator 20 taken along a line 2-2 in FIG. 1, and FIG. 3 is a cross-sectional view illustrating the first separator 20 taken along a line 3-3 in FIG. 1. A fuel cell has a stacked structure in which a plurality of unit cells 110 are stacked in Z-directions illustrated in FIG. 1. FIG. 1 illustrates the first separator 20, and each unit cell 110 is fabricated by stacking a membrane electrode assembly and a second separator onto the first separator 20 in a deeper direction of the drawing. The membrane electrode assembly is fabricated by joining catalyst electrode layers to both sides of an electrolyte membrane, and a central portion thereof serves as a power generating area.

Each unit cell 110 is provided with cooling water manifolds 411-416, fuel gas manifolds 511 and 512, and air manifolds 611-622. The cooling water manifolds 411-413, the fuel gas manifold 511, and the air manifolds 611-616 are manifolds for supplying cooling water, fuel gas and air, respectively. The cooling water manifolds 414-416, the fuel gas manifold 512, and the air manifolds 617-622 are manifolds for discharging cooling water, fuel gas and air, respectively.

As illustrated in FIG. 1, the first separator 20 includes a separator central area portion 20C which opposes to the power generating area at the center of the membrane electrode assembly, and an outer edge portion 20G located in an outer edge of the separator central area portion 20C. The first separator 20 also has cooling water flow paths 420 in the separator central area portion 20C. The cooling water manifolds 411-413 formed in the outer edge portion 20G introduces cooling water and feeds the cooling water to the cooling water flow paths 420. The thus supplied cooling water is rectified by ribs 430, flows through, the cooling water flow paths 420, and is discharged from the cooling water manifolds 414-416.

As illustrated in FIG. 1, the first separator 20 includes gaskets SL1-SL5. Each of the gaskets SL1-SL5 seals their own flow paths so that cooling water, fuel gas and air are not mixed. The gaskets SL1-SL5 and the above-described ribs 430 are rubber molded bodies which are formed by die-casting rubber material using die.

As illustrated in FIGS. 2 and 3, the first separator 20 has an adhesive layer 434 substantially in the entire area of the outer edge portion 20G. The gaskets SL1-SL5, the ribs 430, and a center-side rubber molded body 432 are adhered to the adhesive layer 434 at the outer edge portion 20G. The center-side rubber molded body 432 is also formed by die-casting the die-casting rubber material using the die, similar to the gaskets SL1-SL5 and the ribs 430. Note that the center-side rubber molded body 432 corresponds to a "central area portion side rubber molded body" in the claims. The center-side rubber molded body 432 is located on the separator central area portion 20C side from the gaskets SL1-SL5 and the ribs 430. The gaskets SL1-SL5, the ribs 430, and the center-side rubber molded body 432 are formed by a material having gas impermeability, elasticity, and heat resistance. Specifically, the material is any one of rubber and elastomer. More specifically, the material may be silicon rubber, isobutylene isoprene rubber (ER), acrylic rubber, natural rubber, fluorine rubber, ethylene propylene rubber, styrene elastomer, or fluorinated elastomer. Of course, other materials may also be adopted as long as the material satisfies requirements.

Although the center-side rubber molded body 432 located on the separator central area portion 20C side is distant from the ribs 430 and the gasket SL1, it is located within a reachable range where the die-casting rubber material which leaks from between the die and the adhesive layer 434 at the time of die-casting described later. The height of the center-side rubber molded body 432 from the surface of the outer edge portion 20G is die-casted lower than the height of the gasket SL1 and the ribs 430. The center-side rubber molded body 432 is adhered to the outer edge portion 20G by the adhesive layer 434. In this embodiment, the center-side rubber molded body 432 has about 10 to 20% of the height of the gaskets SL1-SL5, and about 30 to 40% of the height of the ribs 430. Burrs 436 extending between the center-side rubber molded body 432 and the gasket SL1, burrs 436 between the gasket SL1 and the gasket SL4, and burrs 426 extending from the ribs 430 to the cooling water manifold 412 are adhered to the adhesive layer 434 at the outer edge portion 20G. Further, the adhesive layer 434 also adheres the burrs 436 extending around the gasket SL2 and the gasket SL3, and the burrs 436 extending on the separator end (upper and lower ends in FIG. 1) side of the gaskets SL4-SL5 to the outer edge portion 20G. The adhesive layer 434 is formed substantially in the entire area of the outer edge portion 20G. Therefore, the adhesive layer 484 includes and is larger than an area where the gaskets SL1-SL5, the ribs 430, and the center-side rubber molded body 432 are die-casted at the outer edge portion 20G. Note that the adhesive layer 434 is not formed in the separator central area portion 20C which opposes to the power generating area of the membrane electrode assembly.

Figure 4:
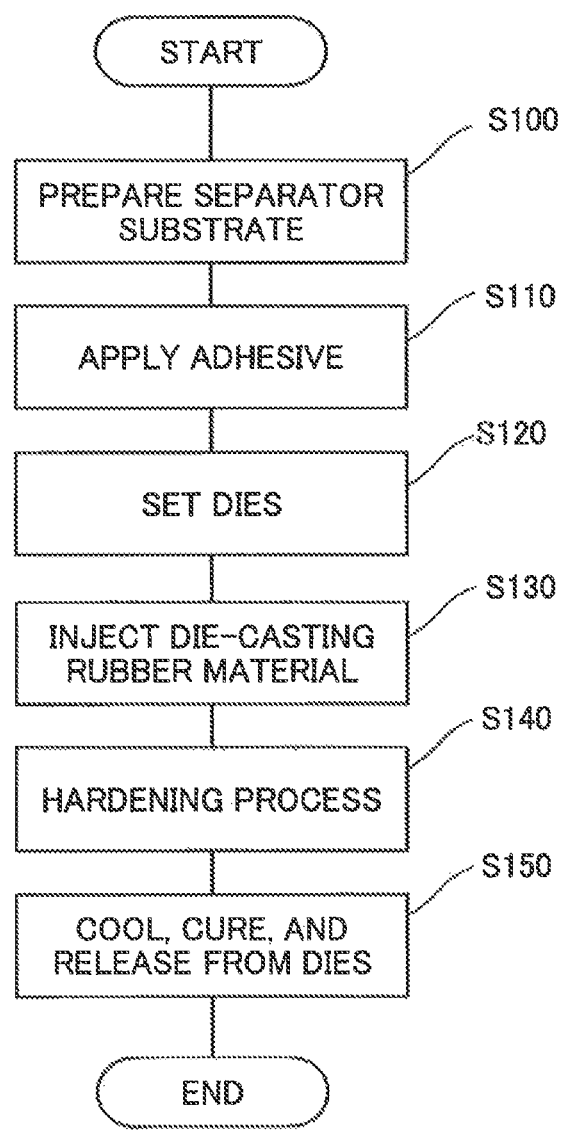
FIG. 4 is a flowchart illustrating a manufacturing procedure of the first separator.
Figure 5:
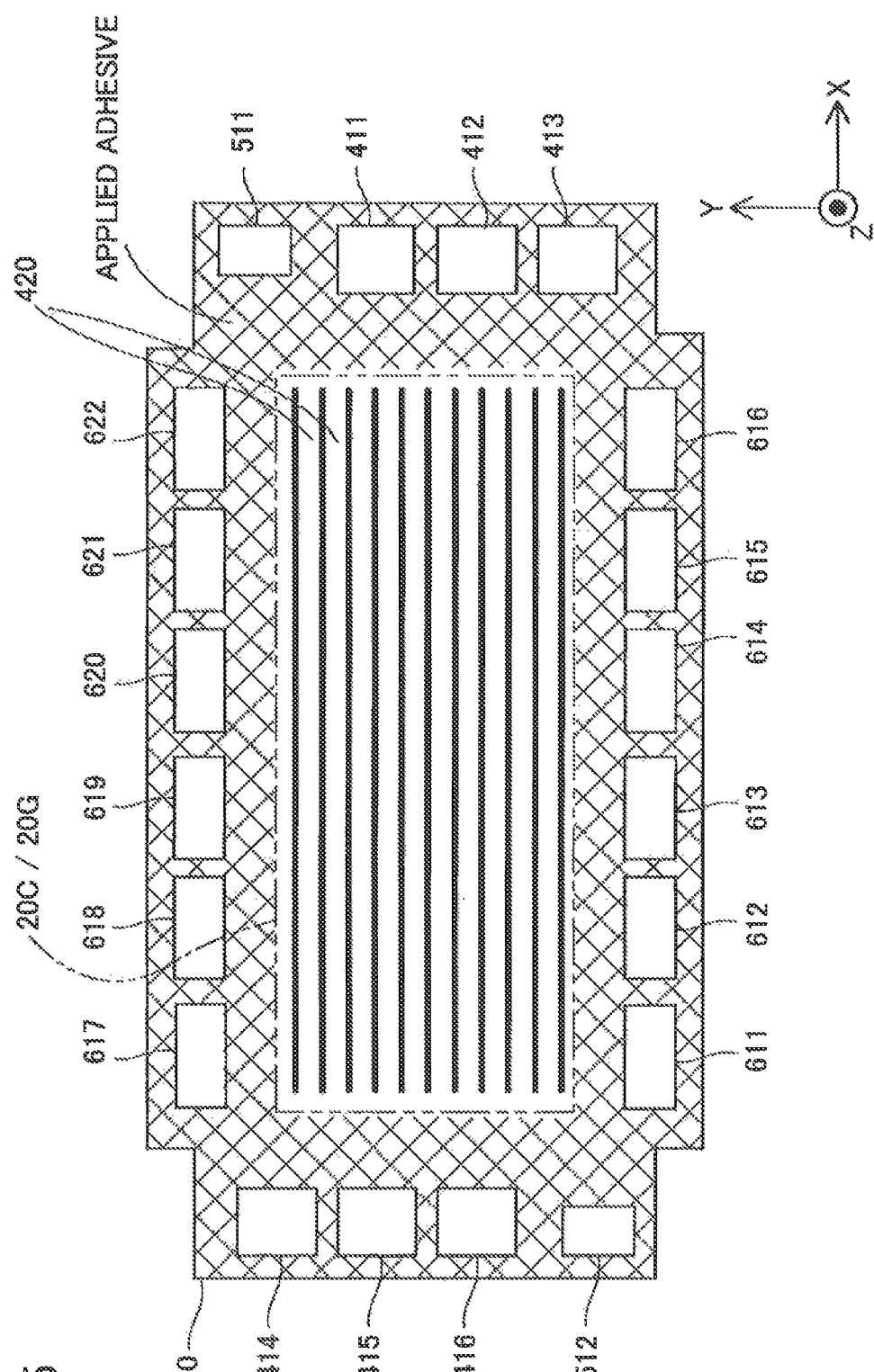
FIG. 5 is a view illustrating a formation area of an adhesive layer.
Figure 6:
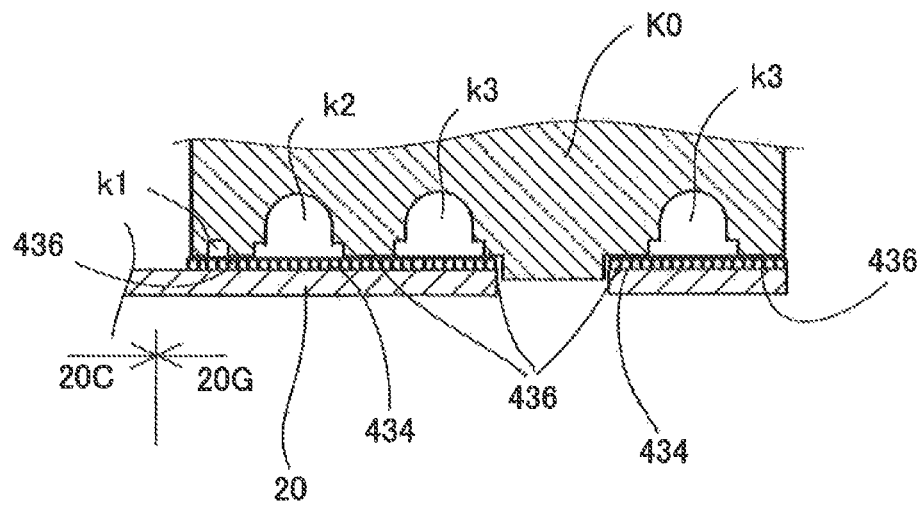
FIG. 6 is a view illustrating a situation of a die corresponding to a gasket and a center-side rubber molded body illustrated in FIG. 2.
Figure 7:
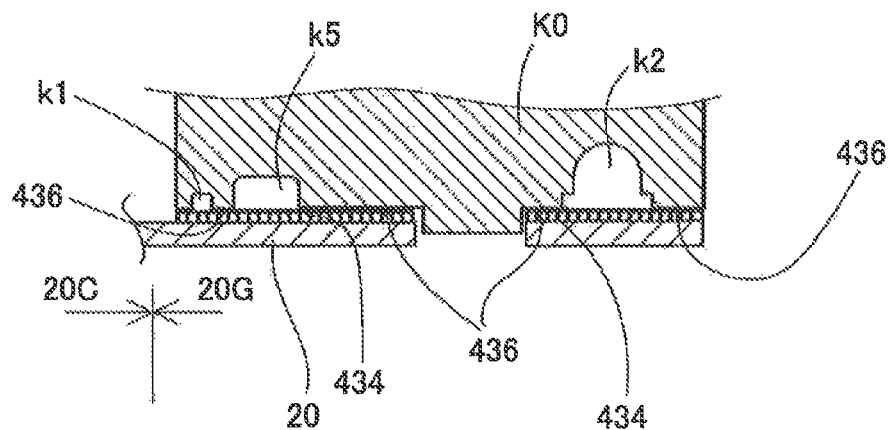
FIG. 7 is a view illustrating a situation of the die corresponding to ribs and the center-side rubber molded body illustrated in FIG. 3.

Next, a manufacturing procedure of the first separator 20 is described. FIG. 4 is a flowchart illustrating the manufacturing procedure of the first separator 20, FIG. 5 is a view illustrating a formation area of the adhesive layer 434. FIG. 6 is a cross-sectional view illustrating the shape of a die corresponding to the gasket SL1 and the center-side rubber molded body 432 illustrated in FIG. 2, and FIG. 7 is a cross-sectional view illustrating the shape of the die corresponding to the ribs 430 and the center-side rubber molded body 432 illustrated in FIG. 3.

As illustrated in FIG. 4, in the manufacturing of the first separator 20, a separator substrate which will serve as the first separator 20 is first prepared (step S100). In the first separator substrate to prepare, the supplying and discharging manifolds for gas and cooling water, such as the cooling water manifold 411, have been already formed, and the cooling water flow paths 420 are formed as well. Alternatively, the supplying and discharging manifolds and the cooling water flow paths 420 may also be formed in the preparing process at step S100.

Next, non-hardened adhesive is applied to the prepared first separator substrate to form the adhesive layer 434 (Step S110). A spray or a brush is used to apply the adhesive, and, as illustrated in FIG. 5, the adhesive is applied over the area of the outer edge portion 20G which extends from the separator central area portion 20C toward the outer edge to form the adhesive layer 434. The adhesive used is thermosetting adhesive, such as epoxy resin, and reveals an adhesive effect by hardening in a hardening process (step S130) after the die-casting rubber material is injected as described later.

Next, the first separator substrate is placed inside a die k0 in a state where the adhesive which forms the adhesive layer 434 is not yet hardened (step S120). As illustrated in FIGS. 6 and 7, the die k0 is provided with gasket cavities k2, k3, etc., for die-casting the gaskets SL1 and SL4, and is also provided with a cavity k1 for die-casting the center-side rubber molded body 432, and cavities k5 for die-casting the ribs 430. The first separator substrate is placed so that the adhesive layer 434 of the first separator substrate surface is pressed against a die end surface of the die k0. Although not illustrated in FIGS. 6 and 7, the die k0 is also provided with cavities for forming the gaskets SL2 and SL3, and the gasket SL5 of FIG. 1.

The die-casting rubber material, such as silicon rubber, described already is injected into the cavity k1 etc. of FIGS. 6 and 7 after the placement into the die (step S130). This rubber injection forms the ribs 430 and the center-side rubber molded body 432 in the outer edge portion 20G of the first separator substrate so as to overlap with the non-hardened adhesive layer 434, in addition to the gaskets SL1-SL5. Then, a hardening process in which the injected die-casting rubber material and the non-hardened adhesive are hardened is performed (step S140). Specifically, the die k0 is heated to a temperature at which the injected die-casting rubber material and the non-hardened adhesive hardens, and this temperature is maintained for a predetermined period of time. Next, the die-casting rubber material and the adhesive are cured until they are sufficiently cooled, and the die-casting rubber material and the adhesive are then released from the die (step S150) to obtain the first separator 20 illustrated in FIG. 1 provided with the gaskets SL1-SL5, the ribs 430, and the center-side rubber molded body 432. In the obtained first separator 20, the adhesive of the adhesive layer 434 hardens, and the adhesive layer 434 certainly adheres the gaskets SL1-SL5, the ribs 430, and the center-side rubber molded body 432 to the outer edge portion 20G during the hardening process at step S140 and the subsequent cooling and curing process.

In this embodiment, the rubber injection is configured so that the die-casting rubber material does not entirely fill the cavity k1 for die-casting the center-side rubber molded body 432. That is, the molten rubber material is injected so as not to completely fill the cavity k1 in consideration of a cavity capacity of the cavity k1 for forming the center-side rubber molded body 432, cavity capacities of the gasket cavities k2 and k3 for forming the gaskets SL1 and SL4, respectively, a leak amount of the molten rubber material from the die end surfaces, cavity capacities of the gasket cavities for forming the gaskets SL2, SL3 and SL5, an injection path capacity in the die, etc. illustrated in FIGS. 6 and 7. Since the leak amount of the molten rubber material from the die end surfaces changes by adjusting the pressure of the first separator 20 against the die k0, a relation of the press pressure, the leak amount of the molten rubber material, and an injecting pressure should just be known beforehand. The molten rubber material leaked from the die end surfaces is hardened through the hardening process at step S140 and the subsequent cooling and curing process to form the burrs 436. In this embodiment, the burrs 436 are also adhered to the outer edge portion 20G of the first separator 20 by the adhesive layer 434.

As described above, the first separator 20 that constitutes the unit cell 110 of this embodiment includes the adhesive layer 434, the ribs 430, the center-side rubber molded body 432, and the gaskets SL1-SL5 in the outer edge portion 20G located in the outer edge of the separator central area portion 20C which opposes to the power generating area of the membrane electrode assembly. When forming the adhesive layer 434 and the rubber molded body such as the ribs 430 in the first separator 20, the adhesive layer 434 is formed in the outer edge portion 20G prior to the formation of the ribs 430, the center-side rubber molded body 432, and the gaskets SL1-SL5, and the adhesive layer 434 adheres the ribs 430, the center-side rubber molded body 432, and the gaskets SL1-SL5 to the outer edge portion 20G. The ribs 430, the center-side rubber molded body 432, and the gaskets SL1-SL5 are formed by die-casting the die-casting rubber material using the die k0. Upon the die-casting, the die-casting rubber material leaks from between the die k0 and the adhesive layer 434, the burrs 436 may be connected with the ribs 430, the center-side rubber molded body 432, and the gaskets SL1-SL5 due to the leaked die-casting rubber material to be formed into a membrane shape.

Since the thus formed burrs 436 have the membrane shape, they do not affect the rectifying function of cooling water caused by the ribs 430 and the sealing function caused by the gaskets SL1-SL5. However, when the burrs 436 are released from the ribs 430 and the gaskets SL1-SL5, they may give adverse effects to the rectifying function and the sealing function described above. Note that the first separator 20 of the unit cell 110 of this embodiment forms the adhesive layer 434 (see FIGS. 2 and 3) over the adhesive layer area which includes the area where the ribs 430, the center-side rubber molded body 432, and the gaskets SL1-SL5 are die-casted in the outer edge portion 20G, and is larger than the area. Thus, the membrane-shaped burrs 436 formed so as to be connected with the ribs 430, the center-side rubber molded body 432, and the gaskets SL1-SL5 are also adhered to the outer edge portion 20G at the adhesive layer 434. Therefore, according to the first separator 20 of the unit cell 110 of this embodiment, since releases or exfoliations of the burrs 436 from the ribs 430, the center-side rubber molded body 432 and the gaskets SL1-SL5 do not occur, the cutting of the burrs 436 becomes at least partially unnecessary, and the burr handling becomes simple, resulting in avoiding the possible damages to the ribs 430 and the gaskets SL1-SL5 accompanying the burr cutting, etc.

The first separator 20 of the unit cell 110 of this embodiment uses the die k0 to form the center-side rubber molded body 432 in the outer edge portion 20G on the separator central area portion 20C side from the ribs 430 and the gaskets SL1-SL5. Moreover, in the first separator 20 of the unit cell 110 of this embodiment, the center-side rubber molded body 432 is die-casted at the height lower than the heights of the gaskets SL1-SL5 from the surface of the outer edge portion 20G within the reachable range of the die-casting rubber material which leaks from between the die k0 and the adhesive layer 434 at the time of die-casting of the ribs 430 and the gaskets SL1-SL5. The first separator 20 of the unit cell 110 of this embodiment adheres the center-side rubber molded body 432 by the adhesive layer 434 to the outer edge portion 20G together with the burrs 436 between the center-side rubber molded body 432 and the gasket SL1 and the burrs 436 between the center-side rubber molded body 432 and the ribs 430. For this reason, the center-side rubber molded body 432 is connected with the ribs 430 and the gaskets SL1-SL5 on the surface of the adhesive layer 434 by the burrs 436. Therefore, there are the following advantages.

The first separator 20 of the unit cell 110 of this embodiment is provided with the center-side rubber molded body 432 at a position distant from the ribs 430 and the gaskets SL1-SL5 toward the separator central area portion 20C. The height of the center-side rubber molded body 432 from the surface of the outer edge portion 20G is lower than the ribs 430 and the gaskets SL1-SL5. Thus, even if the center-side rubber molded body 432 is provided, it does not give a significant influence to the functions, such as the sealing function and the rectifying function of fluid caused by the ribs 430 and the gaskets SL1-SL5. Further, the center-side rubber molded body 432 is formed within the reachable range of the die-casting rubber material which leaks from between the die k0 and the adhesive layer 434 at the time of die-casting of the ribs 430 and the gaskets SL1-SL5. Therefore, the center-side rubber molded body 432 is formed by collecting the leaked, die-casting rubber material in the cavity k1 of the die k0 (see FIGS. 6 and 7). Therefore, the leaked die-casting rubber material becomes difficult to flow toward the separator central area portion 20C side, compared with the formed part of the center-side rubber molded body 432. For this reason, the generation of the burrs 436 can be reduced on the separator central area portion 20C side, and a situation where the power generating area of the membrane electrode assembly which opposes to the separator central area portion 20C becomes narrower due to the burrs can be avoided, compared with the formed part of the center-side rubber molded body 432. For this reason, the power generating area of the membrane electrode assembly can be secured, thereby maintaining the power generation capacity of the fuel cell. In addition, since the burrs 436 which connect the center-side rubber molded body 432, the ribs 430, and the gaskets SL1-SL5 are also adhered to the outer edge portion 20G by the adhesive layer 434, a release and an exfoliation of the burrs 436 are reduced.

In the first separator 20 of this embodiment, the center-side rubber molded body 432 is formed at about 10 to 20% of the height of the gaskets SL1-SL5, and is formed at about 30 to 40% of the height of the ribs 430. Therefore, when the unit cells 110 each having the first separator 20 are stacked, a contact of the center-side rubber molded body 432 of one first separator 20 with another separator (second separator) of adjacent unit cell 110 can certainly be avoided.

In this embodiment, after stacking the plurality of unit cells 110 each of which serves as a power generation unit, the first separator 20 is provided, to each of the unit cells 110. Therefore, according to this embodiment, since damages to the gaskets SL1-SL5 and the ribs 430 are reduced by incorporating the first separator 20, an improvement in durability and an extension of life of the fuel cell are possible. Further, according to this embodiment, the manufacturing cost can be reduced only by replacing separators in an existing fuel cell with the first separators 20.

In this embodiment, the adhesive layer 434 is formed in the outer edge portion 20G of the first separator 20 prior to the die-casting of the gasket SL1 etc., and the gasket SL1 etc. are then die-casted in the die k0 while the adhesive of the adhesive layer 434 is not yet hardened. In addition, the adhesive application area of the adhesive layer 434 includes and is larger than the area where the gasket SL1 etc. are die-casted. Therefore, according to the method of manufacturing the separator of this embodiment, the first separator 20 without any damages to the gasket SL1 etc. can easily be manufactured.

The present invention is not limited to the embodiment described above, and can be implemented in various forms without departing from the scope of the invention. For example, technical features in the embodiment corresponding to technical features of each aspect cited in the section of "SUMMARY," can suitably be substituted and/or combined in order to achieve some or all of the subjects described above, or in order to obtain some or all of the effects described above. The technical features can suitably be deleted if they are not described as essential matters in this specification.

What is claimed is:

1. A separator for a fuel cell, to be disposed opposing to a membrane electrode assembly, comprising:
   a separator central area portion opposing to a center area of the membrane electrode assembly that concerns generating power;
   an outer edge portion located in an outer edge of the separator central area portion;
   a rubber molded body made of rubber, the rubber molded body being formed in the outer edge portion by die-casting;
   an adhesive layer formed in the outer edge portion, for adhering the rubber molded body to the outer edge portion,
   wherein the adhesive layer is formed over an adhesive layer area that includes and is larger than an area where the rubber molded body is die-casted in the outer edge portion; and
   a central area portion side rubber molded body made of rubber, the central area portion side rubber molded body being formed by die-casting, in the outer edge portion on the separator central area portion side from a position of the rubber molded body,
   wherein the central area portion side rubber molded body is die-casted from die-casting rubber material that leaks from between the die and the adhesive layer when die-casting the rubber molded body, at a height lower than a height of the rubber molded body from a surface of the outer edge portion, and is adhered to the outer edge portion by the adhesive layer, and
   wherein the central area portion side rubber molded body is connected with the rubber molded body on a surface of the adhesive layer by a burr formed from the leaked die-casting rubber material.

2. A fuel cell comprising a cell stack formed by stacking a plurality of unit cells,
   wherein each of the unit cells is configured as a power generation unit, and
      each of the unit cells includes the separator in accordance with claim 1, such that the separator opposes to the membrane electrode assembly formed by joining catalyst electrode layers on both membrane surfaces of an electrolyte membrane.

3. A method of manufacturing a separator for a fuel cell, to be disposed opposing to a membrane electrode assembly of the fuel cell, comprising:
   forming an adhesive layer by applying thermosetting adhesive to an outer edge portion located in an outer edge of a separator central area portion opposing to a center area of the membrane electrode assembly that concerns generating power;
   placing the separator, where the adhesive layer is formed, in a die having a cavity for die-casting a rubber molded body made of rubber;
   injecting die-casting rubber material into the cavity to die-cast the rubber molded body;
   curing by heat the adhesive of the adhesive layer to obtain an adhesive effect and hardening the injected die-casting rubber material,
   wherein forming the adhesive layer includes applying the adhesive over an adhesive layer area that includes and is larger than an area where the rubber molded body is die-casted in the outer edge portion; and
   forming a central area portion side rubber molded body made of rubber by die-casting in the outer edge portion on the separator central area portion side from a position of the rubber molded body,
   wherein the central area portion side rubber molded body is die-casted from die-casting rubber material that leaks from between the die and the adhesive layer when die-casting the rubber molded body, at a height lower than a height of the rubber molded body from a surface of the outer edge portion, and is adhered to the outer edge portion by the adhesive layer, and
   wherein the central area portion side rubber molded body is connected with the rubber molded body on a surface of the adhesive layer by a burr formed from the leaked die-casting rubber material.

* * * * *